UNITED STATES PATENT OFFICE.

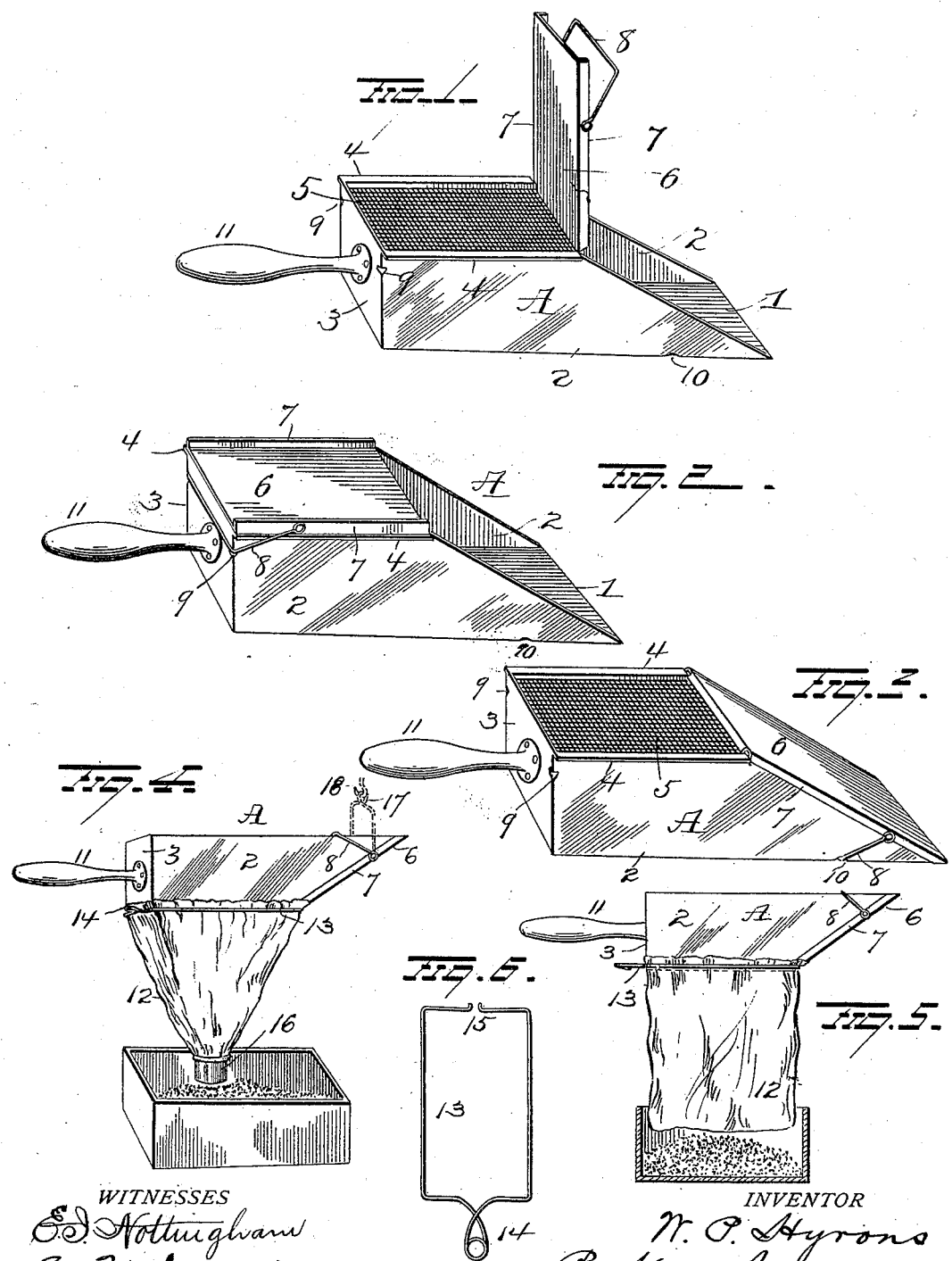

WILLIAM P. HYRONS, OF PHILADELPHIA, PENNSYLVANIA, ASSIGNOR OF ONE-HALF TO FRANK B. GREENE, OF SAME PLACE.

COMBINED SHOVEL AND SIFTER.

SPECIFICATION forming part of Letters Patent No. 645,956, dated March 27, 1900.

Application filed April 8, 1899. Serial No. 712,310. (No model.)

*To all whom it may concern:*

Be it known that I, WILLIAM P. HYRONS, a resident of Philadelphia, in the county of Philadelphia and State of Pennsylvania, have invented certain new and useful Improvements in a Combined Shovel and Sifter; and I do hereby declare the following to be a full, clear, and exact description of the invention, such as will enable others skilled in the art to which it appertains to make and use the same.

My invention relates to an improvement in combined shovels and sifters; and it consists in certain novel features of construction and combinations and arrangements of parts, as will be more fully hereinafter described, and pointed out in the claims.

In the accompanying drawings, Figure 1 is a view in perspective illustrating my improvements. Fig. 2 is a view showing the top or cover over the screen or sieve. Fig. 3 is a view showing the cover over the inlet, and Figs. 4 and 5 are views showing different forms of dust confiners or guards connected to my sifter.

A represents my improved shovel and sifter, made, preferably, of sheet metal, comprising the bottom 1, sides 2 2, and rear end piece 3. The side pieces 2 2 are beveled at their forward ends, as shown, and the top edge of the sides 2 2 are provided with flanges 4, projecting at right angles therefrom, for a purpose more fully hereinafter explained. A screen or sieve 5 is secured to the top of the sides 2 2 and end 3, and a cover 6 is pivotally connected to the sides 2 2 at the front end of the screen or sieve and is adapted to be swung down over the screen and completely cover same to prevent the escape of dust when the device is being used as a shovel. The cover 6 is provided on its side edges with upwardly-projecting flanges 7, to which is pivotally connected a bail 8, adapted to be swung down over projections 9 on the end 3 to lock the cover over the screen or sieve. The cover 6 is adapted when the device is to be used as a sifter to be swung down over the inclined or beveled front edge of the device, as shown in Fig. 3, when the flanges 7 will inclose the sides and the bail 8 locked over projections or shoulders 10 on the bottom of the shovel. Any suitable handle 11 may be secured to the end of the device for conveniently handling the same. A flexible sleeve 12 is adapted to be disposed around the flanges 4 and is held in this position by a spring-frame 13, composed, preferably, of wire bent to form an oblong of approximately the size of the screen or sieve and bent between its ends to form a coiled-spring handle 14 for conveniently operating the same. The ends of the frame 13 are spaced some distance apart and are bent outward, as shown at 15, to prevent catching in the sleeve. The sleeve 12 may be made of any approved form—as, for instance, as shown in Fig. 4. It may be contracted at its lower end and provided with a metal collar 16, or it may be the same size all the way down, as shown in Fig. 5.

If desired, the bail 8 may be bent between its ends to form a loop 17, as shown in dotted lines in Fig. 4, which is adapted to receive a rigid hook 18 to permit the sifter to be swung back and forth with very slight exertion.

Having fully described my invention, what I claim as new, and desire to secure by Letters Patent, is—

1. As a new article of manufacture, a combined scoop and sieve, comprising a receptacle having a sieve or screen at its top and beveled at its front, the said top and beveled front end being of equal dimensions, a cover pivotally secured to the receptacle at the juncture of the sieve and beveled end and adapted to be swung so as to completely cover either the open end of the receptacle or the sieve and means for locking the cover in its two positions.

2. As a new article of manufacture, a combined scoop and sieve, comprising a receptacle having a beveled front end and a sieve in its top, the said beveled front end and top being of equal dimensions, a handle secured to the closed end of the receptacle, a cover hinged to the receptacle at the juncture of the sieve and beveled front end and adapted to completely cover either the sieve or the open front end of the receptacle and means for locking said cover in its two positions.

3. As a new article of manufacture, a combined scoop and sieve, comprising a rectangular receptacle having a beveled open end and a sieve secured in its top, flanges projecting laterally from the sieve portion, a cover pivotally connected to said receptacle and adapted to normally close the open inclined end thereof, a flexible sleeve, the enlarged end thereof being adapted to embrace the top or sieve portion of the receptacle and inclose said lateral flanges and a removable clamp for securing the sleeve over said flanges.

In testimony whereof I have signed this specification in the presence of two subscribing witnesses.

WILLIAM P. HYRONS.

Witnesses:
GEORGE W. SELTZER,
FRANK B. GREENE.